US008631768B1

(12) United States Patent
Sumitsuji

(10) Patent No.: US 8,631,768 B1
(45) Date of Patent: Jan. 21, 2014

(54) METHOD FOR MANUFACTURING TOY FOR CAT AND THE TOY FOR CAT

(71) Applicant: DoggyMan H.A. Co., Ltd., Osaka (JP)

(72) Inventor: Tomoya Sumitsuji, Osaka (JP)

(73) Assignee: DoggyMan H.A. Co., Ltd., Osaka-shi (JP)

( * ) Notice: Subject to any disclaimer, the term of this patent is extended or adjusted under 35 U.S.C. 154(b) by 0 days.

(21) Appl. No.: 13/732,862

(22) Filed: Jan. 2, 2013

(30) Foreign Application Priority Data

Jun. 29, 2012 (JP) .................. 2012-147067

(51) Int. Cl.
*A01K 29/00* (2006.01)
(52) U.S. Cl.
USPC .......................... 119/707; 119/711
(58) Field of Classification Search
USPC .......... 119/707, 709, 710, 711, 702; 264/239, 264/241, 247, 337, 328.1; 425/542, 572
See application file for complete search history.

(56) References Cited

U.S. PATENT DOCUMENTS

| | | | | |
|---|---|---|---|---|
| 1,022,113 | A * | 4/1912 | Smith | 119/711 |
| 3,808,312 | A | 4/1974 | Gould, Jr. et al. | |
| 4,085,180 | A * | 4/1978 | Stoffey | 264/128 |
| 4,557,219 | A * | 12/1985 | Edwards | 425/472 |
| 5,397,522 | A * | 3/1995 | Shinozuka et al. | 264/134 |
| 5,743,213 | A * | 4/1998 | Fujiura | 119/172 |
| 5,797,353 | A * | 8/1998 | Leopold | 119/710 |
| 7,150,245 | B2 * | 12/2006 | Lamstein | 119/711 |
| 7,691,315 | B2 * | 4/2010 | Axelrod | 264/328.8 |
| 8,211,346 | B2 * | 7/2012 | Axelrod et al. | 264/247 |
| 8,367,130 | B1 * | 2/2013 | Tsengas | 426/138 |
| 2005/0276881 | A1 * | 12/2005 | Chen et al. | 426/2 |
| 2011/0206738 | A1 * | 8/2011 | Loew | 424/400 |
| 2011/0206798 | A1 * | 8/2011 | Loew | 426/1 |

FOREIGN PATENT DOCUMENTS

| | | |
|---|---|---|
| JP | 9-19232 A | 1/1997 |
| JP | 11-1554409 A | 6/1999 |
| JP | 2000-069876 A | 3/2000 |
| JP | 2005-279227 A | 10/2005 |
| JP | 3139208 U | 2/2008 |
| WO | WO 2006/054106 A1 | 5/2006 |

\* cited by examiner

*Primary Examiner* — Yvonne Abbott
(74) *Attorney, Agent, or Firm* — Birch, Stewart, Kolasch & Birch, LLP

(57) ABSTRACT

A highly manufacturable toy for cats with which cats can play in direct contact contains silvervine. The manufacturing method involves the preliminary mixing step to form a molding compound by melting a resin raw material and then mixing the molten resin material with silvervine, and the molding step to melt the molding compound formed in the preliminary mixing step and then molding the molten molding compound into a toy shape. Silvervine is characterized in that the degree of activity to cats is increased when it is heated prior to the molding process.

3 Claims, 3 Drawing Sheets

METHOD FOR MANUFACTURING TOY FOR CAT AND THE TOY FOR CAT

TECHNICAL FIELD

The present invention relates to a toy with which a pet cat can play.

BACKGROUND ART

As well as dogs, cats have traditionally been very popular as household pets. As the ongoing birth dearth has become more and more pronounced through the years, cats have come to be increasingly welcomed in households with no children and families who have finished child rearing in place of children. In keeping with a growing number of households having a cat as a pet, many different varieties of toys for cats are on sale at pet stores and so forth.

It has long been known that cats react idiosyncratically (show inclination) to a plant called silvervine (*Actinidia polygama*), and accordingly toys for cats employing silvervine have been proposed to date (refer to Japanese Unexamined Patent Publication JP-A 2005-279227, Japanese Utility Model Registration No. 3139208, and Japanese Unexamined Patent Publication JP-A 9-19232 (1997)).

SUMMARY OF THE INVENTION

Problems to be Solved by the Invention

In the ball-like toy for cats (felt aroma ball) proposed in Japanese Unexamined Patent Publication JP-A 2005-279227, silvervine is used in the form of a flavoring agent applied to a cork or the like, and the cork or the like is set centrally of a ball. This toy for cats has its surface covered with wool for decorative purposes so that it can serve as an interior ornament, and is therefore not suitable for a cat to play in direct contact therewith. Furthermore, the addition of the decorative touch gave rise to an increase in manufacturing costs.

The toy for cats proposed in Japanese Utility Model Registration No. 3139208 is designed as a mascot doll hanging down from a rubber string, at which a cat jumps for exercise to get slim. Silvervine is placed in a pocket attached to the back of the mascot doll. However, this toy for cats is also not intended to allow a cat to play in direct contact therewith, and, for example, operation for the pocket attachment may lead to an increase in manufacturing costs.

The toy for cats proposed in Japanese Unexamined Patent Publication JP-A9-19232 (1997) is constructed by placing the fruits, stems, etc. of silvervine in a plurality of holes formed at the surface of a wooden product to appeal to cats. However, this toy for cats, while being intended to allow a cat to play in direct contact therewith, is made of the wooden product and is thus susceptible to scratches made for example by the claws of a cat. Furthermore, much expense in time and effort maybe required for various operations, including cutting process and the insertion of silvervine into the holes.

The present invention has been devised in view of the problems as mentioned supra, and accordingly its object is to provide a highly manufacturable toy for cats with which cats can play in direct contact.

Means for Solving the Problems

In a method for manufacturing a toy for cats with which cats can play in accordance with the present invention, the first step is to form a molding compound by melting a resin raw material and then mixing the molten resin material with silvervine. Silvervine is characterized in that the degree of activity to cats is increased when it is admixed in the molten resin material. As the next step, the molding compound having a silvervine content is melted, and the molten molding compound is molded into a toy shape. In this way, a toy for cats can be produced. It is preferable that the molding compound contains 10% to 20% by mass of gall-derived silvervine.

In accordance with one aspect of the present invention, a toy for cats includes a part formed by subjecting a mixture of a resin raw material and silvervine to injection molding operation. It is preferable that this injection-molded part of the toy for cats contains 10% to 20% by mass of gall-derived silvervine.

In accordance with another aspect of the present invention, a toy for cats is composed of a back-side portion and a belly-side portion obtained by dividing a fish figure into two topside and underside parts. The back-side portion and the belly-side portion are so designed that each of them is of U-form in cross section perpendicular to a fish's head-tail direction; that the back-side portion is convexly curved toward the back of the fish figure; and that the belly-side portion is convexly curved toward the belly of the fish figure.

The back-side portion has a base part which is recessed in each of its regions corresponding to the eyes of the fish figure beyond other surface region, or equivalently the body surface of the fish figure, and a projection extending outward from each of the base parts.

The belly-side portion has, in each of its regions corresponding to the eyes of the fish figure, a through hole drilled all the way through from the body surface to the interior of the fish figure. "Provision of a through hole in each region" means that the fish figure has a pair of eyes, and correspondingly there are provided two through holes in their respective fish's eye regions.

Any one of the back-side portion and the belly-side portion or both of them are made of a resin raw material blended with 10% to 20% by mass of gall-derived silvervine.

The toy for cats is constructed by fitting the projection of the back-side portion in the through hole so that the back-side portion and the belly-side portion can be combined in one piece.

Effects of the Invention

According to the present invention, there is provided a highly manufacturable toy for cats with which cats can play in direct contact.

MODES FOR CARRYING OUT THE INVENTION

Figure 1:
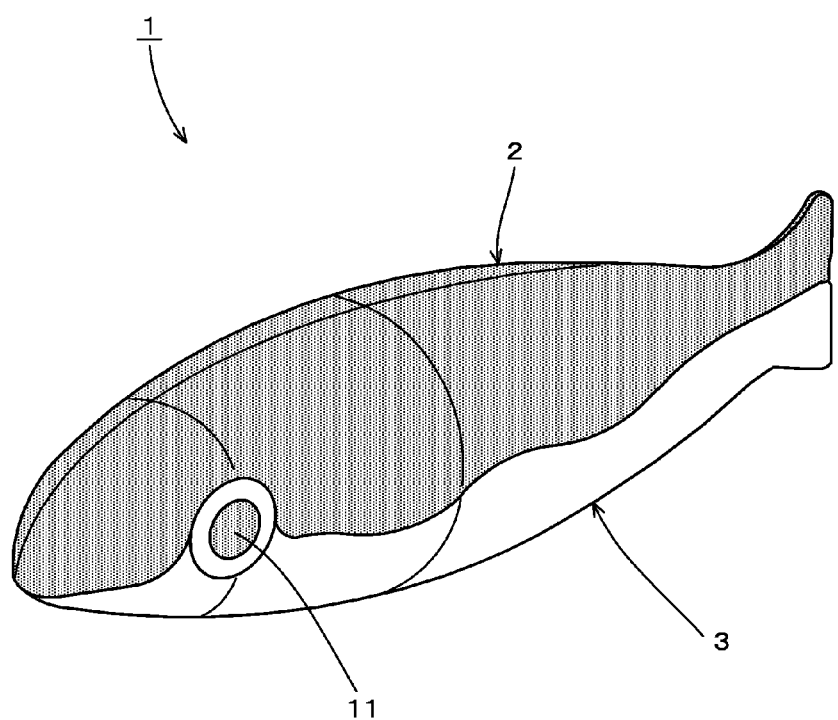
FIG. 1 is a perspective view of a toy for cats.
Figure 2A:
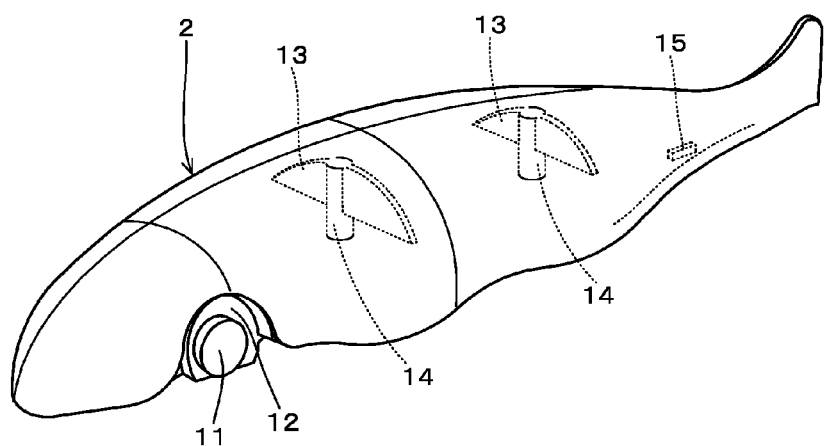
FIG. 2A is a view showing the back-side portion of the toy for cats.
Figure 2B:
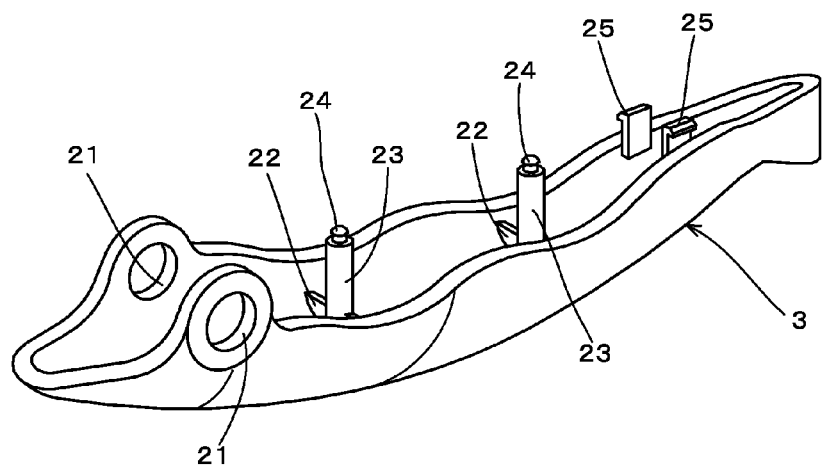
FIG. 2B is a view showing the belly-side portion of the toy for cats.

FIG. 1 is a perspective view of a toy for cats 1, FIG. 2A is a view showing a back-side portion 2 of the toy for cats 1, and FIG. 2B is a view showing a belly-side portion 3 of the toy for cats 1.

The toy for cats 1, which is implemented in the general form of a fish, is composed of two parts, namely the back-side portion 2 and the belly-side portion 3.

Given that the fish-shaped toy for cats 1 is divided into two substantially equal-size topside and underside parts, then the topside part acts as the back-side portion 2. The back-side portion 2 is a hollow body convexly curved toward the back of the fish figure, which is of U-form in cross section perpendicular to the direction of length thereof, expressed differently, a fish's head-tail direction. Although the toy for cats 1 is devoid of a dorsal fin, the "back side" of the toy corresponds to the dorsal fin-bearing side of a common fish.

The back-side portion 2 has, in each of its regions corresponding to the eyes of the fish figure, a projection 11 extending outward in the form of a cylindrical column. The projection 11, which is substantially circular in shape, is so formed as to protrude at a predetermined height from a base part 12 having a flat surface. The base part 12 is concavely curved (recessed) beyond the surface of a nearby region of the back-side portion 2. That is, the projection 11 can be formed by configuring the base part 12 so that it is recessed beyond the surface of the back-side portion 2.

The back-side portion 2 has cylindrical-shaped snap-fit seatings 14, each of which is reinforced with a rib 13, formed in two internal locations thereof, respectively. The snap-fit seating 14 has a recess at its front end, and protrudes toward the belly side of the fish figure. Moreover, the back-side portion 2 is provided with concavities 15 formed by recessing two locations thereof close to the tail of the fish figure.

The back-side portion 2 is made of a molded product of a polypropylene (PP) resin containing 20% by mass of silvervine powder.

On the other hand, the underside part of the fish-shaped toy for cats 1 acts as the belly-side portion 3. Like the back-side portion 2, the belly-side portion 3 is a hollow body convexly curved toward the belly of the fish figure, which is of U-form in cross section perpendicular to the direction of length thereof. The belly-side portion 3 has through holes 21 and 21, each of which has a circular sectional profile, formed in its regions corresponding to the eyes of the fish figure, respectively. The through hole 21 is substantially identical in diameter with the projection 11.

The belly-side portion 3 has cylindrical-shaped snap-fit seatings 23, each of which is reinforced with a rib 22, formed in two locations thereof, respectively. The snap-fit seating 23 protrudes toward the back of the fish figure, and has a ball-like coupling part 24 formed at its front end. Moreover, the belly-side portion 3 has hook-like retaining parts 25 and 25 formed in two locations thereof, respectively, close to the tail of the fish figure.

The belly-side portion 3 is made of a polypropylene (PP) resin, and has no content of silvervine powder.

The back-side portion 2 and the belly-side portion 3 are combined in one piece as follows. That is, the projection 11 of the back-side portion 2 is fitted in the through hole 21 of the belly-side portion 3. Then, the coupling part 24, 24 of the snap-fit seating 23, 23 of the belly-side portion 3 is fitted in the recess formed at the front end of the snap-fit seating 14, 14 of the back-side portion 2. Subsequently, the retaining part 25, 25 of the belly-side portion 3 is fitted in the concavity 15 of the back-side portion 2. Moreover, at the same time, the paired projections 11 of the back-side portion 2 are fitted in their respective paired through holes 21 and 21 of the belly-side portion 3.

Accordingly, the two snap-fit seatings 23 and 23 of the belly-side portion 3 are positioned in a manner such that, in combining the back-side portion 2 and the belly-side portion 3 into the fish figure, the snap-fit seatings 23 and 23 are engageable in their respective snap-fit seatings 14 and 14 of the back-side portion 2. Likewise, the retaining part 25, 25 of the belly-side portion 3 is so positioned as to be engageable in the concavity 15, and also the projection 11 of the back-side portion 2 is so positioned as to be engageable in the through hole 21, 21 of the belly-side portion 3.

Next, the procedure for the manufacture of the toy for cats 1 will be described.

The back-side portion 2 is made from a mixture of silvervine powder and PP pellets 2:8 ratio by mass. By way of preliminary mixing, after being put in a hopper, the ingredients are mixed up and fed to a ruder (extruder), and whereafter squeezed out of a plurality of cavities of a die, and the squeezed mixture is subjected to strand-cut operation. In this way, silvervine-blended PP pellets can be produced (preliminary mixing process). The temperature of operation in the ruder is set at 180 deg. C.

Silvervine powder CM (trade name) marketed by Nippon Funmatsu Yakuhin Co., Ltd. is used for the silvervine powder, and Prime Polypro™ (product number: J-3021 GA) marketed by Prime Polymer Co., Ltd. is used for the PP pellets (polypropylene resin).

After an insect lays an egg in silvervine, a gall, which is a lump-like swelling, is created, and it is known that feline animals become intoxicated by the gall. The silvervine powder for use is derived hundred-percent from such a gall.

The silvervine-blended PP pellets are fed to a plastic molding machine, the temperature of which is adjusted to 160 deg. C., and the resultant molten product is shaped into the back-side portion 2 with a mold.

On the other hand, the belly-side portion 3 is formed by feeding PP pellets directly to a plastic molding machine temperature-adjusted to 160 deg. C., and molding the resultant molten product with a mold.

It is noted that, in the course of production of prototypes of the toy for cats 1, the inventors concerned have found out that cats react more vigorously to silvervine in a pre-heated state, and thus adopted the silvervine-PP preliminary mixing process as above described for the formation of the back-side portion 2. Table 1 shows findings as to the effect of invigorating cat's reaction to silvervine produced by pre-heating silvervine powder prior to injection molding process. The effect has been verified experimentally based on the presence or absence of application of heat to silvervine powder of varying amounts.

TABLE 1

| | Index of cat's reaction (—) | | | | | | | | | |
|---|---|---|---|---|---|---|---|---|---|---|
| | Cat A | | Cat B | | Cat C | | Cat D | | Cat E | |
| Silvervine amount (g) | Heat Application Present | Heat Application Absent | Heat Application Present | Heat Application Absent | Heat Application Present | Heat Application Absent | Heat Application Present | Heat Application Absent | Heat Application Present | Heat Application Absent |
| 0.01 | 1 | 1 | 3 | 3 | 3 | 3 | 3 | 3 | 2 | 2 |
| 0.025 | 2 | 2 | 3 | 3 | 3 | 3 | 3 | 3 | 2 | 2 |
| 0.05 | 2 | 4 | 5 | 4 | 5 | 4 | 5 | 4 | 2 | 2 |

TABLE 1-continued

| | Index of cat's reaction (—) | | | | | | | | | |
|---|---|---|---|---|---|---|---|---|---|---|
| | Cat A | | Cat B | | Cat C | | Cat D | | Cat E | |
| Silver-vine amount (g) | Heat Application Present | Heat Application Absent | Heat Application Present | Heat Application Absent | Heat Application Present | Heat Application Absent | Heat Application Present | Heat Application Absent | Heat Application Present | Heat Application Absent |
| 0.075 | 5 | 4 | 5 | 5 | 5 | 5 | 5 | 5 | 4 | 3 |
| 0.1 | 5 | 4 | 5 | 5 | 5 | 5 | 5 | 5 | 5 | 4 |

Test samples for monitoring cat's reaction have been obtained by a method involving a step of weighing each of powdery silvervines having different masses as listed in "silvervine amount" columns of Table 1 in a petri dish, a step of putting a lid on the petri dish and heating it for 10 minutes in a constant temperature bath at 170 deg. C., and a step of cooling it to an ambient temperature (leaving it to cool by itself). "Index of cat's reaction" columns of Table 1 indicate the result of evaluation of the degree of cat's reaction. More specifically, there were prepared a group of the thereby obtained powdery silvervines having different masses and a group of powdery silvervines having different masses simply placed on their respective petri dishes in an unheated condition. The petri dishes of these groups were placed near cats and the lids thereof were removed, and the owners of the cats observed the reactions of the cats for evaluation. The numerical values of indices of the reactions of the cats represent the following different cat's reactions, respectively.

Figure 3:
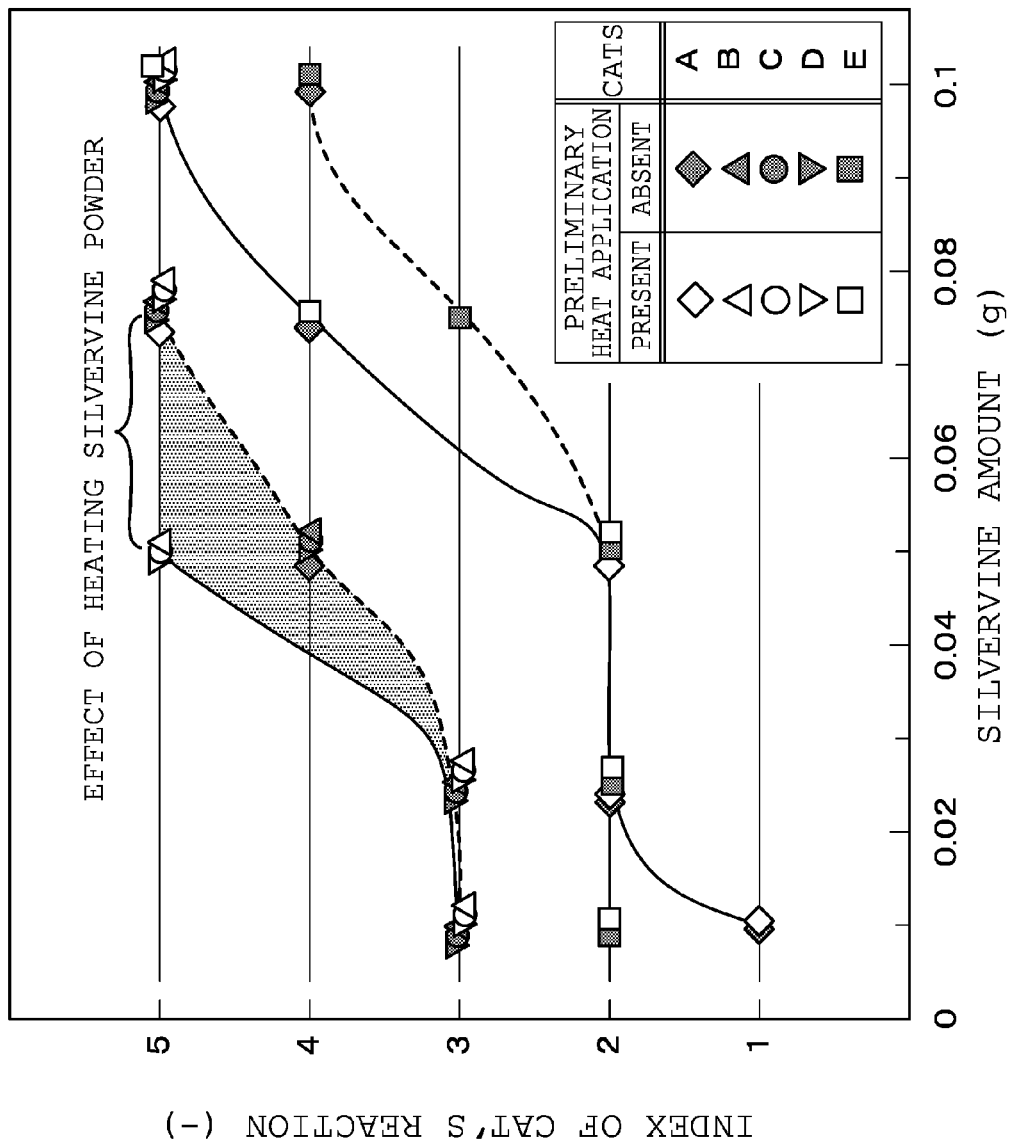
FIG. 3 is a chart indicating the relationship between the amount of silvervine and indices of cat's reaction with reference to Table 1.

Index 1: No reaction (cats moved to smell at petri dishes, but lost interest in short time)
Index 2: Reacted a little (cats tried to continue smelling)
Index 3: Licked silvervine
  Chased silvervine when it was moved away
Index 4: Rubbed against silvervine
Index 5: Intoxicated with consequent slavering FIG. 3 is a chart indicating the relationship between the amount of silvervine and indices of cat's reaction with reference to Table 1. It will be understood from FIG. 3 that, in cases where the amount of a silvervine powder test sample is very small, there is no difference between cat's reaction to a sample in a heated condition and cat's reaction to a sample in a non-heated condition, whereas, in cases where the amount of a silvervine powder sample stands at or above a predetermined level, cats react more vigorously to a sample in a heated condition.

In the embodiment thus far described, the toy for cats 1 may be produced with use of a different resin other than the PP resin. Moreover, silvervine powder having a different gall content from that as above described may be used. Further, silvervine powder may be pre-mixed in the resin raw material used for the belly-side portion 3 instead of being pre-mixed in the resin raw material used for the back-side portion 2. In the case of producing the toy for cats in unitary form by means of injection molding, silvervine powder may be pre-mixed in the resin raw material used for the toy as a whole.

The toy for cats 1 is made of resin, and is therefore impervious to scratches and less prone to breakage even when a cat plays with it in direct contact. Moreover, being produced by means of resin molding, the toy for cats 1 is superior to a wooden product in point of productivity.

In addition, changes and modifications can be made in the toy for cats 1, as well as in the configuration of each portion, the entire structure, the shape, the dimensions, the number of constituent components, the material, and so forth of the toy for cats 1 within the spirit and scope of the present invention.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2012-147067 filed on Jun. 29, 2012 is hereby incorporated by reference.

INDUSTRIAL APPLICABILITY

The present invention is applicable to toys for cats with which pet cats can play.

The invention claimed is:

1. A method for manufacturing a toy for cats with which pet cats can play, comprising:
   a preliminary mixing step to form a molding compound by melting a resin raw material and then mixing the molten resin material with silvervine; and
   a molding step to melt said molding compound formed in said preliminary mixing step and then molding the molten molding compound into a toy shape; wherein, in said preliminary mixing step, the silvering is gall-derived silvervine, and the amount of gall-derived silvervine falls within the range of 10% to 20% by mass.

2. A toy for cats having an injection-molded part which is formed by:
   forming a molding compound by melting a resin raw material and then mix the molten resin material with silvervine;
   melting the molding compound; and
   subjecting the molding compound to an injection molding operation; wherein said injection-molded part contains 10% to 20% by mass of gall-derived silvervine.

3. A toy for cats comprising:
   a back-side portion and a belly-side portion obtained by dividing a fish figure into two topside and underside parts,
   said back-side portion and said belly-side portion being so designed that each of them is of U-form in cross section perpendicular to a fish's head-tail direction, that said back-side portion is convexly curved toward the back of the fish figure, and that said belly-side portion is convexly curved toward the belly of the fish figure,
   said back-side portion including:
   a base part which is recessed in each of regions corresponding to the eyes of the fish figure beyond other surface region, or equivalently the body surface of the fish figure; and
   a projection extending outward from each of said base parts, said belly-side portion having, in each of its regions corresponding to the eyes of the fish figure, a through hole drilled all the way through from the body surface to the interior of the fish figure, any one of said back-side portion and said belly-side portion or both of them being made of a resin raw material blended with 10% to 20% by mass of gall-derived silvervine, said back-side portion and said belly-side portion being combined in one piece by fitting the projection of said back-side portion in said through hole.

\* \* \* \* \*